United States Patent [19]
Plante

[11] Patent Number: 5,967,056
[45] Date of Patent: Oct. 19, 1999

[54] SHIPPING AND STORAGE PALLET

[76] Inventor: Mark M. Plante, 20 Huntington Pl., Norwich, Conn. 06360-4415

[21] Appl. No.: 09/036,430

[22] Filed: Mar. 5, 1998

[51] Int. Cl.[6] .................................................... B65D 19/12
[52] U.S. Cl. ...................................... 108/56.1; 108/57.17
[58] Field of Search ................................. 108/56.1, 56.3, 108/51.11, 57, 57.2, 57.21, 57.17

[56] References Cited

U.S. PATENT DOCUMENTS

| | | | |
|---|---|---|---|
| 3,016,222 | 1/1962 | Arthur | 108/56.1 |
| 3,878,796 | 4/1975 | Morrison | 108/56.1 |
| 4,735,154 | 4/1988 | Hemery | 108/56.1 |
| 5,365,859 | 11/1994 | Schrage | 108/56.1 |
| 5,402,735 | 4/1995 | DeJean | 108/56.1 X |
| 5,579,701 | 12/1996 | Fook Wah | 108/56.1 |
| 5,809,902 | 9/1998 | Zetterberg | 108/56.1 X |

FOREIGN PATENT DOCUMENTS

| | | | |
|---|---|---|---|
| 664558 | 6/1963 | Canada | 108/56.1 |
| 129085 | 8/1950 | Sweden | 108/56.1 |

*Primary Examiner*—Jose V. Chen

[57] ABSTRACT

A new shipping and storage pallet for storing or moving cargo and freight. The device includes an integral deck member with a plurality of spaced apart elongate slat portions that extend between a pair of deck member longitudinal sides and which are arrayed between a pair of deck member lateral sides. Upper surfaces of the slat portions define a deck member top upon which items may be rested. A plurality of spaced apart elongate stringer portions extend from a deck member bottom defined by the lower surfaces of the slat portions. An elongate mounting tongue extends along the length of each deck member stringer portion. An integral base member includes a plurality of spaced apart elongate base slat portions. Each base slat portion extends between longitudinal sides of the base member. Lower surfaces of the base slat portions rest on a surface. Upper surfaces of the base slat portions define a base member top from which a plurality of base member base stringer portions extend. Each of the base member base stringer portions has an elongate mounting groove that extends along the length of the base stringer portion. Each mounting tongue of the deck member stringer portions is inserted into a mounting groove of a base member base stringer portion to form a plurality of complete stringer members. The deck member bottom is spaced apart from the base member top to define an entry space into which the forks of a forklift may be inserted.

14 Claims, 3 Drawing Sheets

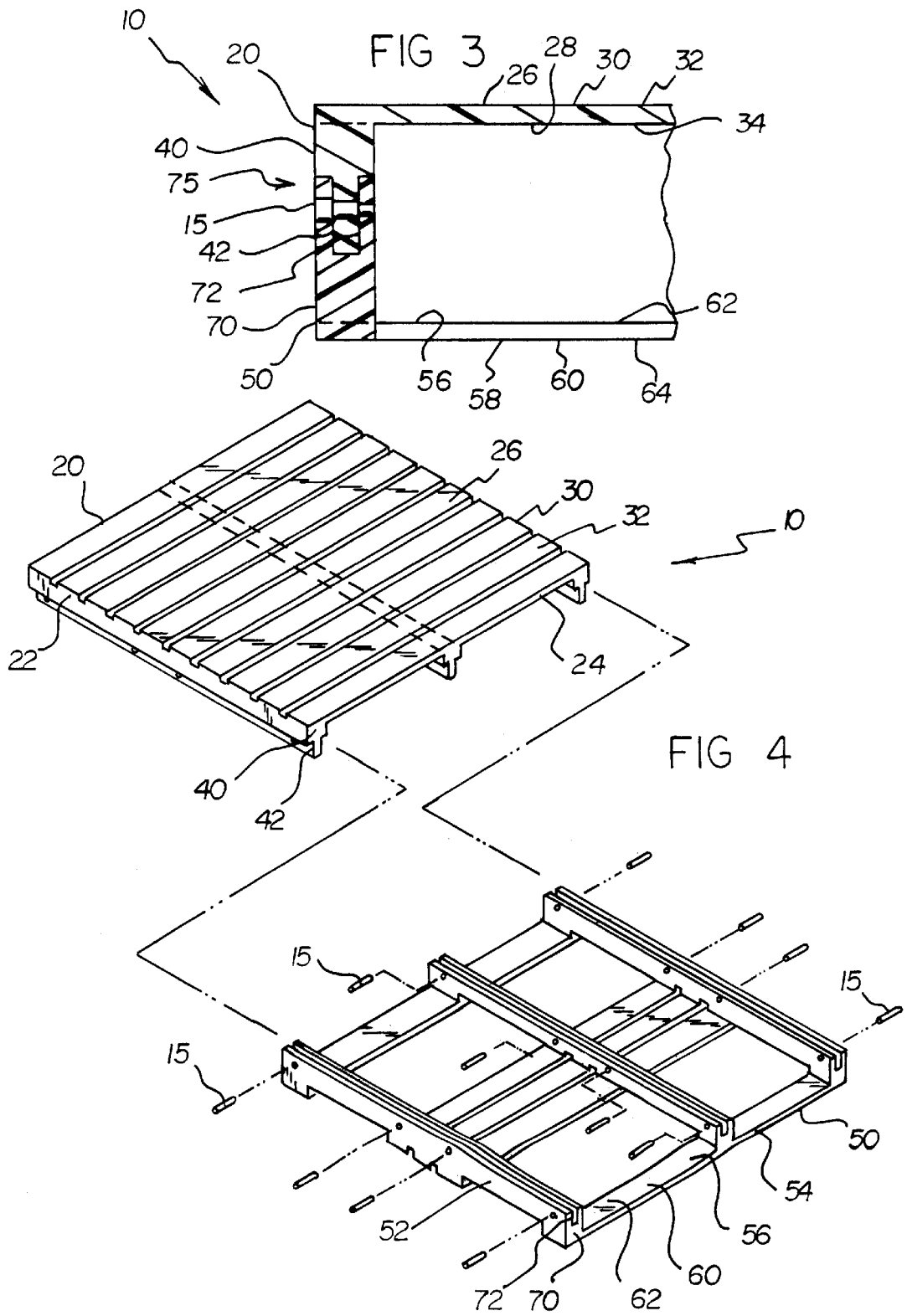

SHIPPING AND STORAGE PALLET

BACKGROUND OF THE INVENTION

1. Field of the Invention

The present invention relates to pallets and more particularly pertains to a new shipping and storage pallet for storing or moving cargo and freight.

2. Description of the Prior Art

The use of pallets is known in the prior art. More specifically, pallets heretofore devised and utilized are known to consist basically of familiar, expected and obvious structural configurations, notwithstanding the myriad of designs encompassed by the crowded prior art which have been developed for the fulfillment of countless objectives and requirements.

Known prior art pallets include U.S. Pat. No. 5,197,396; U.S. Pat. No. 4,843,976; U.S. Pat. No. 5,365,859; U.S. Pat. No. 4,597,338; U.S. Pat. No. 5,413,052; and U.S. Pat. No. Des. 347,511.

While these devices fulfill their respective, particular objectives and requirements, the aforementioned patents do not disclose a new shipping and storage pallet. The inventive device includes an integral deck member with a plurality of spaced apart elongate slat portions that extend between a pair of deck member longitudinal sides and which are arrayed between a pair of deck member lateral sides. Upper surfaces of the slat portions define a deck member top upon which items may be rested. A plurality of spaced apart elongate stringer portions extend from a deck member bottom defined by the lower surfaces of the slat portions. An elongate mounting tongue extends along the length of each deck member stringer portion. An integral base member includes a plurality of spaced apart elongate base slat portions. Each base slat portion extends between longitudinal sides of the base member. Lower surfaces of the base slat portions rest on a surface. Upper surfaces of the base slat portions define a base member top from which a plurality of base member base stringer portions extend. Each of the base member base stringer portions has an elongate mounting groove that extends along the length of the base stringer portion. Each mounting tongue of the deck member stringer portions is inserted into a mounting groove of a base member base stringer portion to form a plurality of complete stringer members. The deck member bottom is spaced apart from the base member top to define an entry space into which the forks of a forklift may be inserted.

In these respects, the shipping and storage pallet according to the present invention substantially departs from the conventional concepts and designs of the prior art, and in so doing provides an apparatus primarily developed for the purpose of storing or moving cargo and freight.

SUMMARY OF THE INVENTION

In view of the foregoing disadvantages inherent in the known types of pallets now present in the prior art, the present invention provides a new shipping and storage pallet construction wherein the same can be utilized for storing or moving cargo and freight.

The general purpose of the present invention, which will be described subsequently in greater detail, is to provide a new shipping and storage pallet apparatus and method which has many of the advantages of the pallets mentioned heretofore and many novel features that result in a new shipping and storage pallet which is not anticipated, rendered obvious, suggested, or even implied by any of the prior art pallets, either alone or in any combination thereof.

To attain this, the present invention generally comprises an integral deck member with a plurality of spaced apart elongate slat portions that extend between a pair of deck member longitudinal sides and which are arrayed between a pair of deck member lateral sides. Upper surfaces of the slat portions define a deck member top upon which items may be rested. A plurality of spaced apart elongate stringer portions extend from a deck member bottom defined by the lower surfaces of the slat portions. An elongate mounting tongue extends along the length of each deck member stringer portion. An integral base member includes a plurality of spaced apart elongate base slat portions. Each base slat portion extends between longitudinal sides of the base member. Lower surfaces of the base slat portions rest on a surface. Upper surfaces of the base slat portions define a base member top from which a plurality of base member base stringer portions extend. Each of the base member base stringer portions has an elongate mounting groove that extends along the length of the base stringer portion. Each mounting tongue of the deck member stringer portions is inserted into a mounting groove of a base member base stringer portion to form a plurality of complete stringer members. The deck member bottom is spaced apart from the base member top to define an entry space into which the forks of a forklift may be inserted.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new shipping and storage pallet apparatus and method which has many of the advantages of the pallets mentioned heretofore and many novel features that result in a new shipping and storage pallet which is not anticipated, rendered obvious, suggested, or even implied by any of the prior art pallets, either alone or in any combination thereof.

It is another object of the present invention to provide a new shipping and storage pallet which may be easily and efficiently manufactured and marketed.

It is a further object of the present invention to provide a new shipping and storage pallet which is of a durable and reliable construction.

An even further object of the present invention is to provide a new shipping and storage pallet which is susceptible of a low cost of manufacture with regard to both materials and labor, and which accordingly is then susceptible of low prices of sale to the consuming public, thereby making such shipping and storage pallet economically available to the buying public.

Still yet another object of the present invention is to provide a new shipping and storage pallet which provides in the apparatuses and methods of the prior art some of the advantages thereof, while simultaneously overcoming some of the disadvantages normally associated therewith.

Still another object of the present invention is to provide a new shipping and storage pallet for storing or moving cargo and freight.

Yet another object of the present invention is to provide a new shipping and storage pallet which includes an integral deck member with a plurality of spaced apart elongate slat portions that extend between a pair of deck member longitudinal sides and which are arrayed between a pair of deck member lateral sides. Upper surfaces of the slat portions define a deck member top upon which items may be rested. A plurality of spaced apart elongate stringer portions extend from a deck member bottom defined by the lower surfaces of the slat portions. An elongate mounting tongue extends along the length of each deck member stringer portion. An integral base member includes a plurality of spaced apart elongate base slat portions. Each base slat portion extends between longitudinal sides of the base member. Lower surfaces of the base slat portions rest on a surface. Upper surfaces of the base slat portions define a base member top from which a plurality of base member base stringer portions extend. Each of the base member base stringer portions has an elongate mounting groove that extends along the length of the base stringer portion. Each mounting tongue of the deck member stringer portions is inserted into a mounting groove of a base member base stringer portion to form a plurality of complete stringer members. The deck member bottom is spaced apart from the base member top to define an entry space into which the forks of a forklift may be inserted.

Still yet another object of the present invention is to provide a new shipping and storage pallet that is stronger and longer-lasting than conventional pallets.

Even still another object of the present invention is to provide a new shipping and storage pallet that may be constructed from recycled materials, such as plastics.

Even still yet another object of the present invention is to provide a new shipping and storage pallet that includes interchangeable components for adaptability to different uses and easy repair.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a cross-sectional view of the present invention taken from Line 3—3 of FIG. 2.

FIG. 4 is a perspective breakaway view of the present invention.

DESCRIPTION OF THE PREFERRED EMBODIMENT

Figure 1:
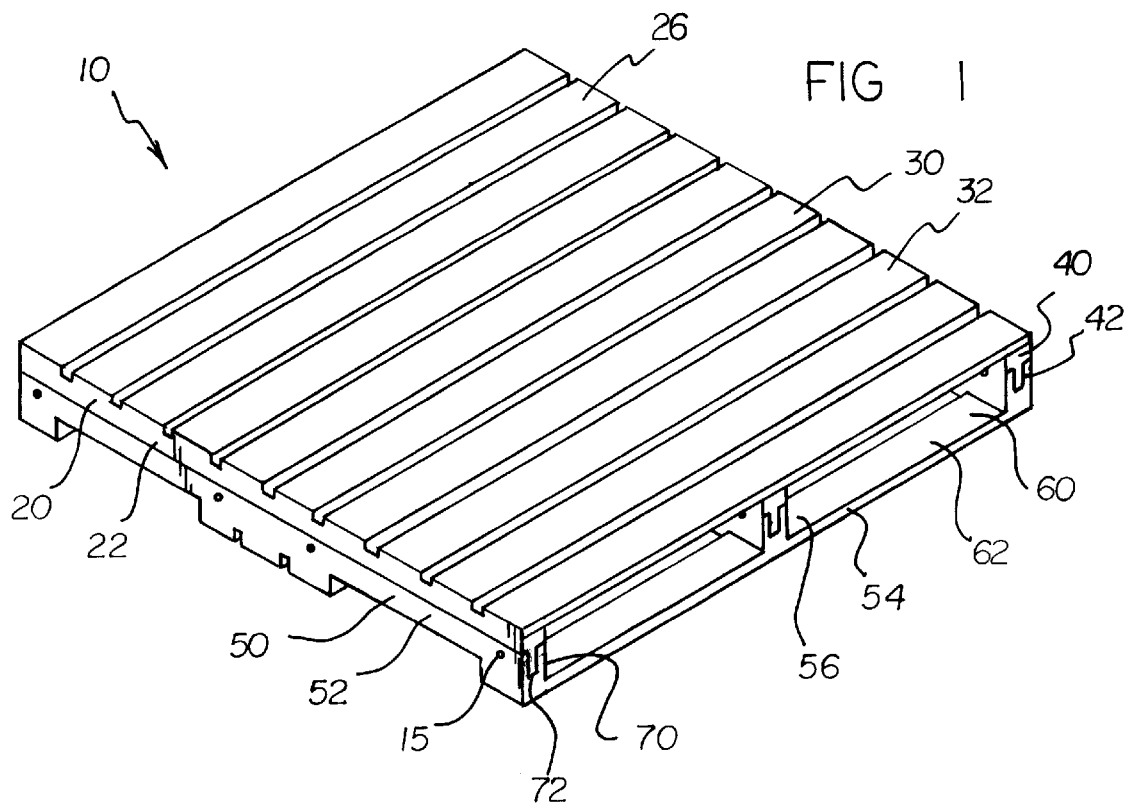
FIG. 1 is a perspective view of a new shipping and storage pallet according to the present invention.
Figure 2:
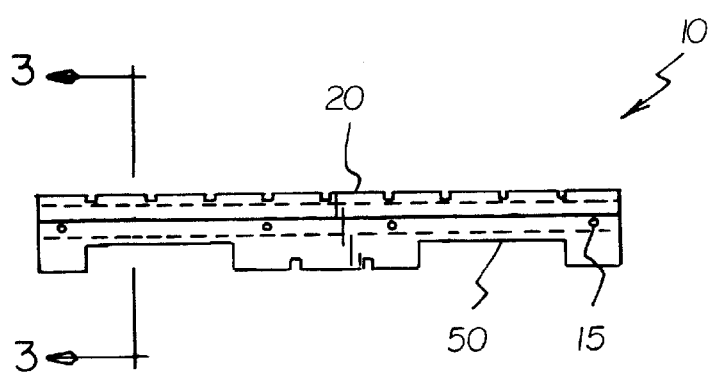
FIG. 2 is a side view of the present invention.

With reference now to the drawings, and in particular to FIGS. 1 through 6 thereof, a new shipping and storage pallet embodying the principles and concepts of the present invention and generally designated by the reference numeral 10 will be described.

As best illustrated in FIGS. 1 through 6, the shipping and storage pallet 10 comprises an integral deck member 20 with a plurality of spaced apart elongate slat portions 30 that extend between a pair of deck member longitudinal sides 24 and which are arrayed between a pair of deck member lateral sides 22. Upper surfaces 32 of the slat portions 30 define a deck member top 26 upon which items may be rested. A plurality of spaced apart elongate stringer portions 40 extend from a deck member bottom 28 defined by the lower surfaces 34 of the slat portions 30. An elongate mounting tongue 42 extends along the length of each deck member stringer portion 40. An integral base member 50 includes a plurality of spaced apart elongate base slat portions 60. Each base slat portion 60 extends between longitudinal sides 54 of the base member 50. Lower surfaces 64 of the base slat portions 60 rest on a surface. Upper surfaces 62 of the base slat portions 60 define a base member top 56 from which a plurality of base member base stringer portions 70 extend. Each of the base member base stringer portions 70 has an elongate mounting groove 72 that extends along the length of the base stringer portion 70. Each mounting tongue 42 of the deck member stringer portions 40 is inserted into a mounting groove 72 of a base member base stringer portion 70 to form a plurality of complete stringer members 75. The deck member bottom 28 is spaced apart from the base member top 56 to define an entry space into which the forks of a forklift may be inserted.

The integral deck member 20 includes a pair of lateral sides 22, a pair of longitudinal sides 24, a plurality of spaced apart elongate slat portions 30, and a plurality of spaced apart elongate stringer portions 40.

Each slat portion 30 has an upper surface 32 and a lower surface 34. The slat portions 30 extend between the longitudinal sides 24 of the deck member 20 and are arrayed between the lateral sides 22 of the deck member 20. The upper surfaces 32 of the slat portions 30 define a deck member top 26 upon which items may be rested. The lower surfaces 34 of the slat portions 30 define a deck member bottom 28. Preferably, the deck member 20 has at least ten spaced apart elongate slat portions 30.

The deck member stringer portions 40 extend from the deck member bottom 28. The length of each deck member stringer portion 40 extends between the lateral sides 22 of the deck member 20. A deck member stringer portion 40 is located towards each of the deck member longitudinal sides 24. Each deck member stringer portion 40 has an elongate mounting tongue 42 that extends along the length of the deck member stringer portion 40. Preferably, the deck member 20 includes at least three spaced apart elongate stringer portions 40. Ideally, as depicted in FIG. 1, a third deck member stringer portion 40 is centrally located between the deck member longitudinal sides 24.

As shown in FIG. 4, the integral base member 50 includes a pair of lateral sides 52, a pair of longitudinal sides 54, a plurality of spaced apart elongate base slat portions 60, and a plurality of spaced apart elongate base stringer portions 70.

Each base slat portion 60 has an upper surface 62 and a lower surface 64. The base slat portions 60 extend between the longitudinal sides 54 of the base member 50 and are arrayed between the lateral sides 52 of the base member 50. A base slat portion 60 is located towards each of the base member lateral sides 52. The lower surfaces 64 of the base slat portions 60 are for resting on a surface. The upper surfaces 62 of the base slat portions 60 define a base member top 56. Preferably, the base member 50 includes at least five spaced apart elongate base slat portions 60. Ideally, as shown in FIG. 4, at least three base slat portions 60 are centrally located between the base member lateral sides 52.

The base member base stringer portions 70 extend from the base member top 56. The length of each base member base stringer portion 70 extends between the lateral sides 52 of the base member 50. A base stringer portion 70 is located towards each of the base member longitudinal sides 54. Each base stringer portion 70 has an elongate mounting groove 72 that extends along the length of the base stringer portion 70. Each of the mounting tongues 42 of the deck member stringer portions 40 is inserted into a mounting groove 72 of a base member base stringer portion 70 to form a plurality of complete stringer members 75. Preferably, the base member 50 includes at least three spaced apart elongate base stringer portions 70. Ideally, as illustrated in FIG. 4, a base stringer portion 70 is centrally located between the base member longitudinal sides 54. In such an embodiment, the mounting tongue 42 of a centrally positioned deck member stringer portion 40 is inserted into the mounting groove 72 of the centrally positioned base member base stringer portion 70.

The deck member bottom 28 is spaced apart from the base member top 56 to define an entry space which permits insertion of the forks of a forklift into the entry space.

Figure 5:
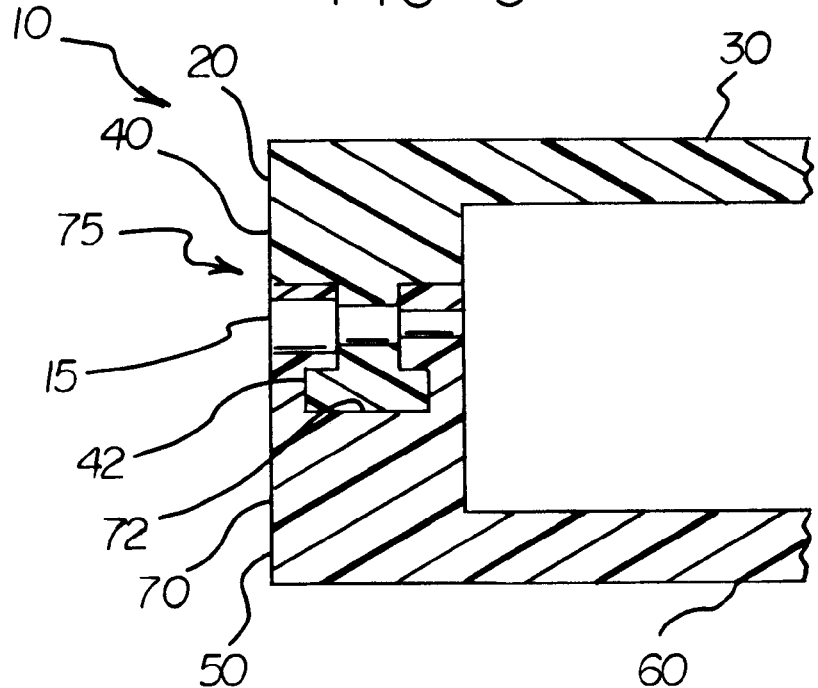
FIG. 5 is a cross-sectional view of the present invention illustrating an alternate design for a mounting tongue of a deck member stringer portion and a mounting groove of a base member stringer portion.
Figure 6:
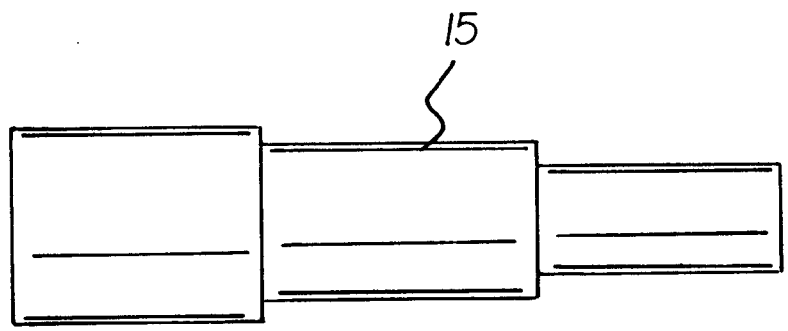
FIG. 6 is a side view of a securing pin of the present invention.

Preferably, as illustrated in FIGS. 3 and 5, a securing pin 15 extends through each of the base stringer portions 70 and each of the deck member stringer portions 40 to secure each deck member stringer portion 40 to a base stringer portion 70. In the preferred embodiment, as shown in FIG. 1, at least four securing pins 15 extend through each of the complete stringer members 75 to secure each deck member stringer portion 40 to a base stringer portion 70.

Also preferably, as shown in FIG. 3, the mounting tongues 42 of the deck member stringer portions 40 and the mounting grooves 72 of the base member base stringer portions 70 are rectangular in shape. In an alternate embodiment, as shown in FIG. 5, the mounting tongues 42 of the deck member stringer portions 40 and the mounting grooves 72 of the base member base stringer portions 70 are T-shaped so that the deck member stringer portions 40 and the base member base stringer portions 70 interlock when the mounting tongues 42 of the deck member stringer portions 40 are inserted into the mounting grooves 72 of the base stringer portions 70.

Ideally, the shipping and storage pallet 10 is constructed from a plastic to provide a high strength to weight ratio as well as water resistance. Even more ideally, a plastic derived from recycled materials is used.

In use, a base member 50 and a deck member 20 are formed from a resilient material such as wood or molded plastic. The base member 50 is positioned with the lower surfaces 64 of the base slat portions 60 resting on a surface. The mounting tongues 42 of the deck member stringer portions 40 are inserted into the mounting grooves 72 of the base member base stringer portions 70. The longitudinal sides 24 of the deck member 20 are aligned with the longitudinal sides 54 of the base member 50 and securing pins 15 are inserted into the complete stringer members 75 to secure each deck member stringer portion 40 to a base stringer portion 70. Items are rested on the deck member top 26. The forks of a forklift may be inserted into the entry space to move the shipping and storage pallet 10.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A pallet, comprising:

a deck member having a pair of lateral sides, a pair of longitudinal sides, a plurality of spaced apart elongate slat portions, and a plurality of spaced apart elongate stringer portions;

each said slat portion having an upper surface and a lower surface, each said slat portion being extended between said longitudinal sides of said deck member, said slat portions being arrayed between said lateral sides of said deck member, said upper surfaces of said slat portions defining a deck member top for resting items thereon, said lower surfaces of said slat portions defining a deck member bottom;

said deck member stringer portions being extended from said deck member bottom, each of said deck member stringer portion having an elongate mounting tongue being extended along the length of said deck member stringer portion, the length of each said deck member stringer portion being extended between said lateral sides of said deck member, a said deck member stringer portion being located towards each of said deck member longitudinal sides;

a base member having a pair of lateral sides, a pair of longitudinal sides, and a plurality of spaced apart elongate base slat portions, and a plurality of spaced apart elongate base stringer portions;

each said base slat portion having an upper surface, a lower surface, each said base slat portion being extended between said longitudinal sides of said base member, said base slat portions being arrayed between said lateral sides of said base member, a said base slat portion being located towards each of said base member lateral sides, said lower surfaces of said base slat portions being for resting on a surface, said upper surfaces of said base slat portions defining a base member top;

said base member base stringer portions being extended from said base member top, each of said base member stringer portions having an elongate mounting groove being extended along the length of said base member stringer portion, the length of each said base member base stringer portions being extended between said lateral sides of said base member, a said base member portion being located towards each of said base member longitudinal sides, each of said tongues of said deck member stringer portions being inserted into a said mounting groove of a said base member base stringer portion to form a plurality of complete stringer members; and said lower surfaces of said deck member slat portions being spaced apart from said upper surfaces of said base member slat portions such that said deck member bottom is spaced apart from said base member top to define an entry space therebetween to permit insertion of the forks of a forklift therein.

2. The pallet of claim 1, further comprising a securing pin being extended through each of said complete stringer members to secure each deck member stringer portion to a base stringer portion.

3. The pallet of claim 2, wherein at least four securing pins are extended through each of said complete stringer members to secure each deck member stringer portion to a base stringer portion.

4. The pallet of claim 1, wherein another said deck member stringer portion is centrally located between said deck member longitudinal sides, and wherein another said base member stringer portion being centrally located between said base member longitudinal sides, said tongue of said centrally positioned deck member stringer portion being inserted into said mounting groove of said centrally positioned base member base stringer portion.

5. The pallet of claim 1, wherein said deck member has at least ten spaced apart elongate slat portions.

6. The pallet of claim 1, wherein said deck member has at least three of said spaced apart elongate stringer portions, a said deck member stringer portion being centrally located between said deck member longitudinal sides, and wherein said base member has at least three of said spaced apart elongate base stringer portions, a said base member stringer portion being centrally located between said base member longitudinal sides.

7. The pallet of claim 1, wherein said base member has at least five spaced apart elongate base slat portions, at least three said base slat portions being centrally located between said base member lateral sides.

8. A pallet, comprising:
a deck member having a pair of lateral sides, a pair of longitudinal sides, at least ten spaced apart elongate slat portions, and at least three of spaced apart elongate stringer portions;

each said slat portion having an upper surface, a lower surface, each said slat portion being extended between said longitudinal sides of said deck member, said slat portions being arrayed between said lateral sides of said deck member, said upper surfaces of said slat portions defining a deck member top for resting items thereon, said lower surfaces of said slat portions defining a deck member bottom;

said deck member stringer portions being extended from said deck member bottom, each of said deck member stringer portions having an elongate mounting tongue being extended along the length of said deck member stringer portion, the length of each said deck member stringer portions being extended between said lateral sides of said deck member, a said deck member stringer portion being located towards each of said deck member longitudinal sides, another said deck member stringer portion being centrally located between said deck member longitudinal sides;

a base member having a pair of lateral sides, a pair of longitudinal sides, and at least five spaced apart elongate base slat portions, and at least three of spaced apart elongate base stringer portions;

each said base slat portion having an upper surface, a lower surface, each said base slat portion being extended between said longitudinal sides of said base member, said base slat portions being arrayed between said lateral sides of said base member, a said a said base slat portion being located towards each of said base member lateral sides, at least three said base slat portions being centrally located between said base member lateral sides, said lower surfaces of said base slat portions being for resting on a surface, said upper surfaces of said base slat portions defining a base member top;

said base member base stringer portions being extended from said base member top, each of said base member stringer portion having an elongate mounting groove being extended along the length of said base member stringer portion, the length of each said base member base stringer portions being extended between said lateral sides of said base member, a said base member portion being located towards each of said base member longitudinal sides, another said base member stringer portion being centrally located between said base member longitudinal sides, each of said tongues of said deck member stringer portions being inserted into a said mounting groove of a said base member base stringer portion to form a plurality of complete stringer members;

at least four securing pins being extended through each of said complete stringer members to secure each deck member stringer portion to a base stringer portion; and said lower surfaces of said deck member slat portions being spaced apart from said upper surfaces of said base member slat portions such that said deck member bottom is spaced apart from said base member top to define an entry space therebetween to permit insertion of the forks of a forklift therein.

9. A pallet, comprising:
a deck member having a plurality of spaced apart and substantially parallel elongate deck slat portions, and a plurality of spaced apart and substantially parallel elongate deck stringer portions coupled to lower surfaces of said deck slat portions of said deck member and extending transversely to said deck slat portions of said deck member;

each of said deck stringer portions of said deck member having a downwardly extending mounting tongue along a bottom edge of the respective deck stringer portion;

a base member having a plurality of spaced apart and substantially parallel elongate base slat portions, and a plurality of spaced apart and substantially parallel elongate base stringer portions coupled to upper surfaces of said base slat portions of said base member and extending transversely to said base slat portions of said base member;

each of said base stringer portions of said base member having an elongate mounting groove therein along an upper edge of the respective base stringer portion;

each deck stringer portion of said deck member being associated with a corresponding base stringer portion of said base member;

said mounting tongue of each deck stringer portion of said deck member being inserted into said mounting groove of the associated corresponding base stringer portion of said base member; and said lower surfaces of said deck slat portions being spaced above said upper surfaces of said base slate portions when said mounting tongues are inserted into said mounting grooves to define an entry space therebetween to permit insertion of the forks of a forklift therein.

10. The pallet of claim 9, wherein said mounting tongues and said mounting grooves are of complementary cooperating transverse cross sections such that removal of said mounting tongues from said mounting grooves is prohibited without relative lateral sliding motion therebetween.

11. The pallet of claim 10, where in said transverse cross sections of said mounting tongues and said mounting grooves are generally T-shaped.

12. The pallet of claim 9, wherein at least one securing pin is extended through each associated mounting tongue and groove pair to secure the associated mounting tongue and groove pairs together.

13. The pallet of claim 12, wherein each securing pin comprises a plurality of coaxial cylindrical portions including opposite first end portions and a middle portion interposed between said end portions of the respective securing pin, said first end portion having an outer diameter greater than said middle portion to define a first annular shoulder therebetween, said middle portion having an outer diameter greater than said second end portion to define a second annular shoulder therebetween.

14. The pallet of claim 9, wherein said base slat portions are arranged in three groups with first and second groups each comprising one base slat portion and a third group comprising three base slat portions, said third group being spaced apart from and interposed between said first and second groups.

* * * * *